(12) United States Patent
Freitag et al.

(10) Patent No.: US 11,770,085 B2
(45) Date of Patent: Sep. 26, 2023

(54) METHOD FOR OPERATING AN ELECTRIC MACHINE

(71) Applicant: Robert Bosch GmbH, Stuttgart (DE)

(72) Inventors: Christian Freitag, Rutesheim (DE); Leonard Weiss, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/782,347

(22) PCT Filed: Nov. 6, 2020

(86) PCT No.: PCT/EP2020/081307
§ 371 (c)(1),
(2) Date: Jun. 3, 2022

(87) PCT Pub. No.: WO2021/110355
PCT Pub. Date: Jun. 10, 2021

(65) Prior Publication Data
US 2023/0041926 A1 Feb. 9, 2023

(30) Foreign Application Priority Data

Dec. 6, 2019 (DE) ..................... 10 2019 219 037.5

(51) Int. Cl.
*H02M 7/77* (2006.01)
*H02P 23/14* (2006.01)
*H02P 27/06* (2006.01)

(52) U.S. Cl.
CPC .............. *H02P 23/14* (2013.01); *H02P 27/06* (2013.01)

(58) Field of Classification Search
CPC .......... H02P 23/14; H02P 27/06; H02P 5/747; H02M 7/77
See application file for complete search history.

(56) References Cited

U.S. PATENT DOCUMENTS

| 7,466,086 B2 * | 12/2008 | Kiuchi | H02P 5/747 318/52 |
| 2016/0156291 A1 * | 6/2016 | Becker | H02M 7/77 318/400.26 |

FOREIGN PATENT DOCUMENTS

| DE | 19532142 A1 | 3/1997 |
| DE | 102012217116 A1 | 3/2014 |
| DE | 102015215871 A1 * | 2/2017 |
| DE | 102015215871 A1 | 2/2017 |
| DE | 102016217887 A1 | 3/2018 |
| DE | 102018205514 A1 | 10/2019 |
| WO | 2019097627 A1 | 5/2019 |

OTHER PUBLICATIONS

Translation of International Search Report for Application No. PCT/EP2020/081307 dated Jan. 18, 2021 (3 pages).

* cited by examiner

*Primary Examiner* — Cortez M Cook
(74) *Attorney, Agent, or Firm* — Michael Best & Friedrich LLP

(57) ABSTRACT

The invention relates to a method for operating an electric machine (100) having a power converter (100) and multiple phases, in which method, phase currents flowing through the phases during operation of the electric machine (100) are determined and are used for continued operation of the electric machine (100), the phase currents being determined taking account of a fundamental wave and at least one harmonic of the current profile of each phase current.

10 Claims, 2 Drawing Sheets

METHOD FOR OPERATING AN ELECTRIC MACHINE

BACKGROUND OF THE INVENTION

The present invention relates to a method for operating an electric machine comprising a power converter and a plurality of phases, as well as an arithmetic logic unit and a computer program for performing said method.

Electric machines, in particular when used in a vehicle, can be operated in motor mode and/or generator mode using a power converter, in particular an inverter, which is fed from a DC voltage circuit. Clocked driving of switching elements, in particular semiconductor switching elements such as MOSFETs or IGBTs, for example by way of pulse width modulation (PWM), is conventional for such inverters, which are also referred to as traction inverters. This in particular serves the purpose of obtaining a desired voltage characteristic, for example one which is as sinusoidal as possible.

In the case of electric machines (or drives) in the automotive sector, the standard ISO 26262 is generally used, in which the so-called "Automotive Safety Integrity Level" (ASIL) is defined. For electric machines with an ASIL classification, the generated torque is generally assigned a safety load, i.e. the generated torque must have a preset accuracy.

For reasons of cost, the torque of an electric machine can be determined using measured phase currents and corresponding machine equations; a torque sensor is then not required. In this case, however, as accurate as possible detection of the phase currents is important in order to meet the requirements of ISO 26262. The phase currents are generally used in the current regulation, by means of which a setpoint torque can be realized. Inaccurately detected phase currents therefore result in an inaccurately set torque, which in turn can result in an infringement of safety targets according to ISO 26262.

DE 10 2012 217 116 A1 discloses, for example, a method in which phase currents are determined and sometimes also measured during the operation of such an electric machine.

SUMMARY OF THE INVENTION

The invention proposes a method for operating an electric machine and an arithmetic logic unit and a computer program for performing said method.

The invention relates to a method for operating an electric machine comprising a power converter and a plurality of phases. The power converter may be, for example, an inverter, in which a DC voltage is converted into an AC voltage by means of clocked driving of switching elements (for example semiconductors such as MOSFETs or IGBTs) at a clock frequency. Such clocked driving of the switching elements is preferably used in order to generate a sinusoidal AC voltage. For this purpose, for example, so-called sine wave-delta modulation can be used.

Furthermore, in the method, during operation of the electric machine, phase currents flowing through the phases are determined and used for the continued operation of the electric machine, for example for the closed-loop control of a torque to be set. As already mentioned, the phase currents can be measured for this purpose, for example by means of suitable current-measuring devices, for example measurement of a voltage drop across a measuring resistor is conceivable.

In the measurement of the phase currents it is now necessary to take account of the fact that there are certain times at which a measurement should take place in order to obtain as accurate and up-to-date a value as possible. For example, an ideal measurement time is either in the middle of the On time and/or in the middle of the Off time in relation to a PWM period in the case of the mentioned clocked driving. This can result in the individual phase currents not being measured at the same time. This is the case in particular when the phases are driven so as to have a time offset, i.e. when there are at least two phases which are driven so as to have an offset which respect to one another.

The latter is the case, for example, in the case of an electric machine having two times three phases, in which there is a time offset between the driving of the first three phases and the further three phases or such a time offset is used. On the basis of this example, the present method will be explained in more detail later as well, but it goes without saying that the proposed method is not applicable for this one example, but is transferable for any desired types of electric machines having a plurality of phases.

When subjecting the torque of the electric machine in which the measured or present phase currents are intended to be used to closed-loop control, however, it should be noted that the present phase currents for all phases are required at a specific and in particular the same time, in particular as feedback variable. Since an accurate measurement usually cannot take place for all the phases at the same time, however, as has already been mentioned above, a conversion of the phase currents of all of the phases to the same time needs to be performed.

In the case of such a conversion, it has now been demonstrated that inaccuracies occur in the case of simple assumption of a sinusoidal characteristic of the phase currents. This in particular is due to the fact that the characteristics of the phase currents not only consist of a fundamental but also various harmonics can make contributions of different magnitudes.

In the proposed method, therefore, the phase currents are determined taking into consideration a fundamental and at least one harmonic of a current characteristic of each phase current, which is typically at least substantially sinusoidal. This relates preferably to cases in which detected or measured phase currents are converted to a different time, in particular to a common time. In this way, it is therefore possible to avoid, for example, a situation whereby a variation in the phase current at a measurement time which is based on a harmonic is assumed as belonging to the fundamental and included erroneously in the conversion, which would lead to incorrect values for the phase current.

The number and type of harmonics which are taken into consideration in this case can be tuned, for example, to an individual electric machine or a specific type of electric machine. For example, on the basis of test measurements and/or simulations it is possible for it to have been determined that the fifth and the seventh harmonics are particularly incident and require corresponding corrections. In this case, the fifth and the seventh harmonics, in addition to the fundamental, can then be taken into consideration.

The phase currents determined at different times can then be converted to a common time and thus be used for the operation or the closed-loop control. In particular, only the phase currents of the fundamental are determined or used as the phase currents on which the operation or the closed-loop control is based.

Although it is particularly preferred when closed-loop control of the electric machine with respect to a preset torque takes places on the basis of the determined phase currents, it is likewise preferred, in addition or as an alternative, when a diagnosis of the electric machine is performed on the basis of the determined phase currents and/or when measured phase currents are plausibility-checked on the basis of the determined phase currents. In the latter case, the determined phase currents should in particular be understood to mean the phase currents determined or calculated from the measured phase currents taking into consideration the fundamental and harmonics. Even in these cases, the proposed method enables particularly accurate determination of the phase currents, As mentioned, expediently only the determined fundamental acts as the basis for the closed-loop control.

Particularly expedient is the use of the proposed method in electric machines which are used in vehicles having relatively high vehicle power supply system voltages, for example 48 V or higher, in particular as drive motors or traction machines. Likewise, this can be used in other, in particular ASIL-relevant, electric machines, however, for example those which are used in the case of electric steering.

An arithmetic logic unit according to the invention, for example a control device, in particular a motor control device, of a motor vehicle, or an open-loop and/or closed-loop control unit of an electric machine, is designed, in particular in terms of software, to perform a method according to the invention.

The implementation of a method according to the invention in the form of a computer program or computer program product with program code for performing all of the method steps is also advantageous since this incurs particularly low costs, in particular when an executing control device is also being used for other tasks and is therefore present in any case. Suitable data carriers for providing the computer program are in particular magnetic, optical and electrical storage devices, such as, for example, hard disks, flash memories, EEPROMs, DVDs and many more. A download of a program over computer networks (Internet, intranet, etc.) is also possible.

Further advantages and configurations of the invention result from the description and the attached drawings.

The invention is illustrated schematically using an exemplary embodiment in the drawings and will be described below with reference to the drawings.

DETAILED DESCRIPTION

Figure 1:
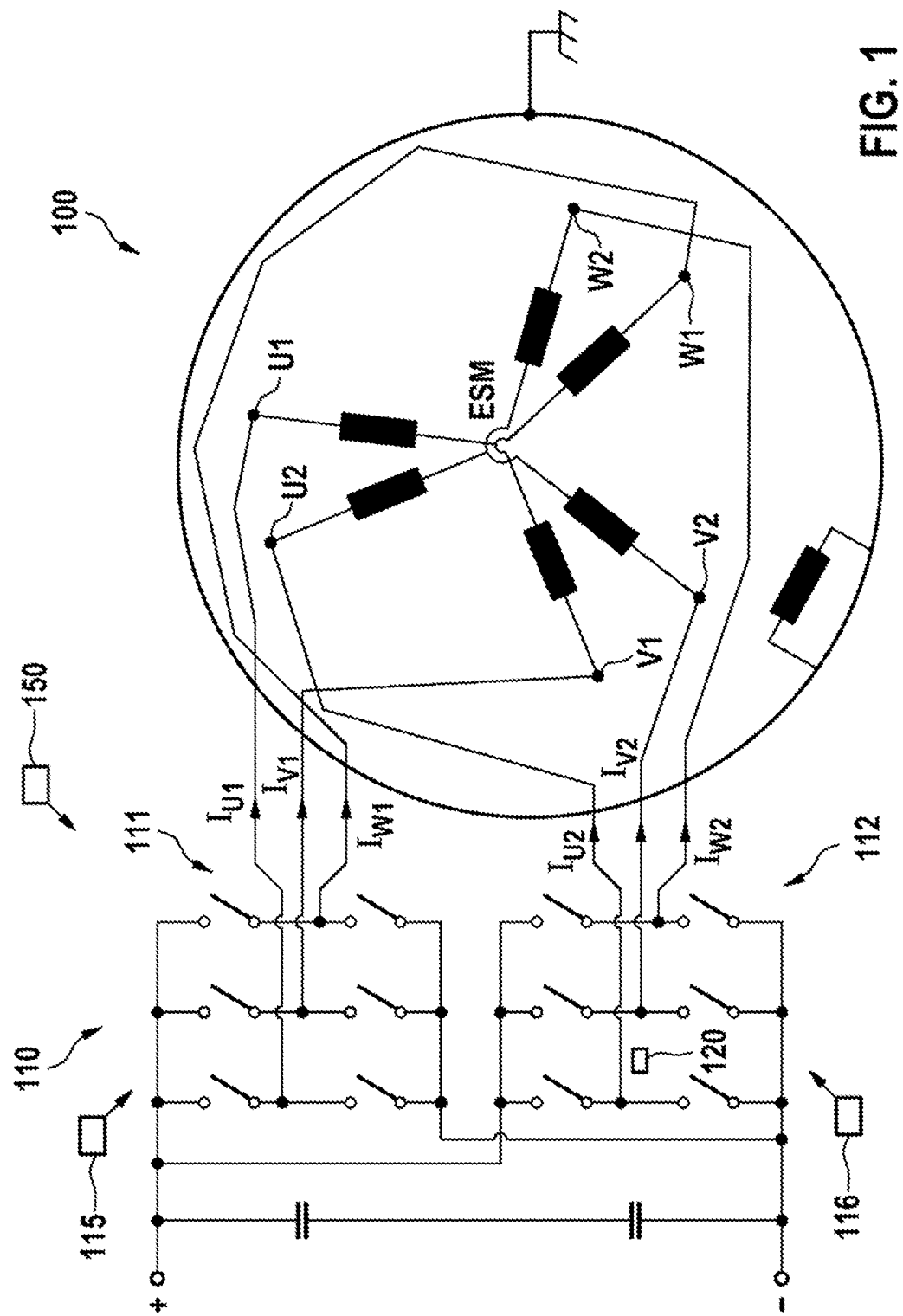
FIG. 1 shows, schematically, an electric machine comprising a power converter, in which a method according to the invention can be performed.

FIG. 1 shows, schematically, an electric machine 100 comprising a power converter 110, in which a method according to the invention can be performed. The electric machine has (in a stator, not illustrated) six phases (phase windings), which form two three-phase current groups as subsystems and are denoted by U1, V1 and W1 and U2, V2 and W2. In this case, for example, there is an electrical phase shift of 30° between the two subsystems U1, V1, W1 and U2, V2, W2. A three-phase current group is characterized by an electrical connection of the phase windings in the stator, in this case, for example, a common neutral point, but is not electrically connected to phases of other three-phase current groups in the stator and can therefore have a dedicated drive scheme, which, in principle, can be different than drive schemes of other three-phase current groups.

The power converter 110 has two parts 111 and 112, which are each in the form of conventional bridge rectifiers, have six switching elements (not denoted), for example semiconductors such as MOSFETs, and each serve to drive one of the subsystems U1, V1, W1 or U2, V2, W2 (i.e. to connect it to the DC voltage terminals of the power converter). The power converter is interconnected with a positive and a negative terminal, for example into a vehicle power supply system of a vehicle as DC voltage terminals, via a capacitance, in this case, for example, in the form of two capacitors (not denoted). In addition, by way of example, an open-loop and/or closed-loop control unit 150 is shown which is used for driving the power converter 110, in particular for opening and closing the switching elements. It goes without saying that such a control unit can also be integrated in the power converter.

The clocked driving of the two subsystems U1, V1, W1 and U2, V2, W2 in this case takes place via two separate drive circuits 115 and 116, and with a time offset of, for example, 25 µs. In this case in each case one phase current $I_{U1}$, $I_{V1}$ and $I_{W1}$ or $I_{U2}$, $I_{V2}$ and $I_{W2}$ flows through the phases. These phase currents can be measured or detected, for example, by means of a current sensor or a current-measuring device—one such device is denoted schematically and by way of example by 120.

As already mentioned, an ideal measurement time is, for example, in the middle of the On time and/or in the middle of the Off time in relation to a PWM period of the mentioned clocked driving. Thus, a measurement of the respective phase current is in any case not possible for all phases at the same time.

Figure 2:
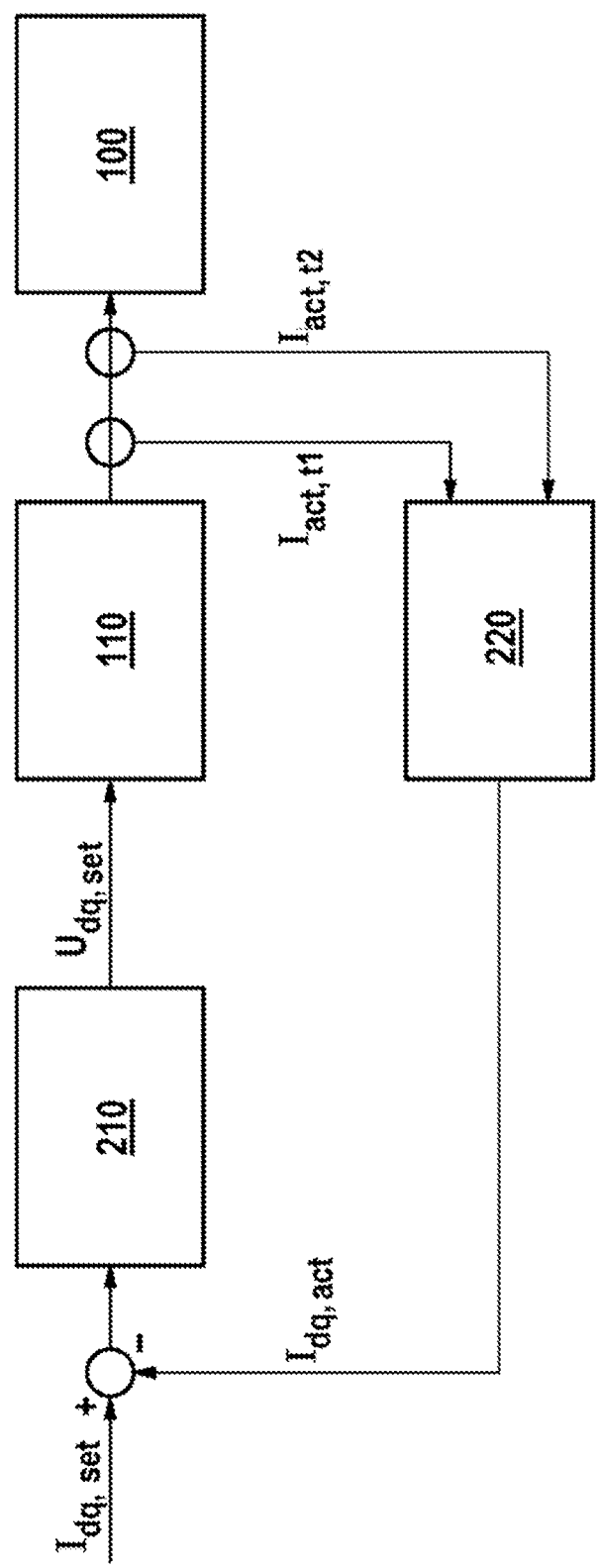
FIG. 2 shows, schematically, a sequence of a method according to the invention in a preferred embodiment.

FIG. 2 shows schematically a sequence of a method according to the invention in a preferred embodiment. In this regard, the electric machine 100 comprising the power converter 110 can be used as shown in FIG. 1. Shown in particular here is a closed-loop control scheme for the closed-loop control with respect to a specific current $I_{dq,set}$ (in so-called d-q coordinates), which specifies a torque of the electric machine.

A difference between the setpoint value $I_{dq,set}$ and the associated actual value $I_{dq,act}$ is given in a controller 210, in which corresponding manipulated values for the voltage, $U_{dq,set}$, are determined. These can be set, if appropriate after conversion into actual voltage values for the phases U1, V1, W1 or U2, V2, W2, at the power converter 110, which results in corresponding phase currents and therefore a torque of the electric machine 100.

In this case, the actual phase currents $I_{act,t1}$ and $I_{act,t2}$ are measured, as mentioned with reference to FIG. 1, to be precise at different times $t_1$ and $t_2$. The phase currents $I_{act,t1}$ in this case represent the actual values for the phase currents $I_{U1}$, $I_{V1}$ and $I_{W1}$, and the phase currents $I_{act,t2}$ represent the actual values for the phase currents $I_{U2}$, $I_{V2}$ and $I_{W2}$. It should be noted here that, as already mentioned with reference to FIG. 1, the driving of the two subsystems U1, V1, W1 and U2, V2, W2 takes place with a time offset, which also goes along with a measurement of the phase currents in the two subsystems which is offset in time (in relation to the in each case ideal measurement time), i.e. at times $t_{h1}$ and $t_2$, respectively.

These actual phase currents $I_{act,t1}$ and $I_{act,t2}$ are converted into the present actual value $I_{dq,act}$ as part of a transformation 220, taking into consideration fundamental and harmonics.

This will be explained in more detail below using corresponding equations and the exemplary system described up to now.

In this case, a symmetrical design of the electric machine and symmetrical driving should be assumed. The six phase currents are given as follows, purely under consideration of the fundamental:

$$I_{U1}(t_1) = \hat{I}_{U1} \cdot \sin(\omega t_1 + \varphi),$$

$$I_{V1}(t_1) = \hat{I}_{V1} \cdot \sin\left(\omega t_1 - \frac{2\pi}{3} + \varphi\right),$$

$$I_{W1}(t_1) = \hat{I}_{W1} \cdot \sin\left(\omega t_1 - \frac{4\pi}{3} + \varphi\right),$$

$$I_{U2}(t_2) = \hat{I}_{U2} \cdot \sin\left(\omega t_2 - \frac{\pi}{6} + \varphi\right),$$

$$I_{V2}(t_2) = \hat{I}_{V2} \cdot \sin\left(\omega t_2 - \frac{2\pi}{3} - \frac{\pi}{6} + \varphi\right)$$

and $$I_{W2}(t_2) = \hat{I}_{W2} \cdot \sin\left(\omega t_2 - \frac{4\pi}{3} - \frac{\pi}{6} + \varphi\right).$$

In this case, $\hat{I}_{U1}$ specifies the amplitude of the phase current $I_{U1}$; corresponding designations apply for the other phase currents. $\varphi$ specifies a phase angle. The phase currents of the second subsystem at time $t_2$ can now be converted to time $t_1$ (in the example in this case $t_2-t_1=25$ µs):

$$I_{U2}(t_1) = \hat{I}_{U2} \cdot \sin\left(\omega t_1 - \frac{\pi}{6} + \varphi\right),$$

$$I_{V2}(t_1) = \hat{I}_{V2} \cdot \sin\left(\omega t_1 - \frac{2\pi}{3} - \frac{\pi}{6} + \varphi\right)$$

and $$I_{W2}(t_1) = \hat{I}_{W2} \cdot \sin\left(\omega t_1 - \frac{4\pi}{3} - \frac{\pi}{6} + \varphi\right).$$

During this conversion, the phase current is assumed to be purely sinusoidal, whereas possible harmonics are ignored and the information thereon is not available to the phase current closed-loop control owing to the assumption of a false fundamental, as already mentioned above. An increased torque ripple and a possible infringement of the safety target (on the basis of an ASIL specification) would be the consequence. With the method proposed here within the scope of the invention, now also (incident) harmonics can be taken into consideration as well as the fundamental of the phase current, and therefore the torque ripple can be reduced.

Owing to the use of all of the measured phase currents at times $t_1$ and $t_2$, it is possible to draw a conclusion on incident harmonics depending on the number of measured currents. Using the example of a 2×3-phase electric machine having an electrical phase shift of 30° between the subsystems (as explained in relation to FIG. 1), the following mathematical relationship can be derived for, for example, two further harmonics (in this case the fifth and the seventh were selected as incident harmonics) in phase currents:

$$I_{U1}(t_1)=\hat{I}_{U1,F}\cdot\sin(\omega t_1+\varphi_{U1,F})+\hat{I}_{U1,5}\cdot\sin(5\cdot\omega t_1+\varphi_{U1,5})+\hat{I}_{U1,7}\cdot\sin(7\cdot\omega t_1+\varphi_{U1,7}).$$

In this case, $\hat{I}_{U1,F}$, $\hat{I}_{U1,5}$ and $\hat{I}_{U1,7}$ specify the amplitudes of the phase currents in the fundamental, the fifth harmonic and the seventh harmonic, respectively. The corresponding phase angles are denoted by $\varphi_{U1,F}$, $\varphi_{U1,5}$ and $\varphi_{U1,7}$. In the same way, equations which consider the fifth and seventh harmonics can be specified correspondingly for the further five phases with corresponding times $t_1$ and $t_2$ and corresponding amplitudes and phase angles.

Using the symmetrical design of the electric machine and symmetrical driving, the assumptions can still be derived and met that the fundamental and the harmonics have the same amplitude, i.e. that the following applies for the fundamental, for example:

$$\hat{I}_F=\hat{I}_{U1,F}=\hat{I}_{V1,F}=\hat{I}_{W1,F}=\hat{I}_{U2,F}=\hat{I}_{V2,F}=\hat{I}_{W2,F}.$$

The corresponding then applies to the fifth and seventh harmonics with the amplitudes $\hat{I}_5$ and $\hat{I}_7$. Likewise, the assumption can be derived or met that the phase angles are in each case identical, i.e. the following applies for the fundamental, for example:

$$\varphi_F=\varphi_{U1,F}=\varphi_{V1,F}=\varphi_{W1,F}=\varphi_{U2,F}=\varphi_{V2,F}=\varphi_{W2,F}.$$

The corresponding then applies to the fifth and seventh harmonics with the phase shifts or phase angles $\varphi_5$ and $\varphi_7$.

With these assumptions, six equations result with six unknowns (the amplitudes: $\hat{I}_F$, $\hat{I}_5$, $\hat{I}_7$ and the phase angles $\varphi_F$, $\varphi_5$, $\varphi_7$), which can be determined by simple mathematics. If the phase currents are not all measured at the same time, as takes place, for example, during time-offset driving of the phases of the two subsystems (as explained above), now all six phase currents can be determined for one time together with their dominant harmonics.

In the following example, the phase current of phase U2 is calculated for time $t_1$ together with the fifth and seventh harmonics:

$$I_{U2}(t_1) = \hat{I}_F \cdot \sin\left(\omega t_1 - \frac{\pi}{6} + \varphi_F\right) + \hat{I}_5 \cdot \sin(5 \cdot \omega t_1 + \varphi_5) + \hat{I}_7 \cdot \sin(7 \cdot \omega t_1 + \varphi_7).$$

Correspondingly, for example, the phase currents of the phases V2 and W2 can be calculated for the time $t_1$ together with the fifth and seventh harmonics. In this way, therefore, the phase currents of the phases with time-offset driving can be converted very accurately into corresponding phase currents at the time of the driving of the phases without the time offset. In turn, it is then possible to determine from this the actual value Idq, with the result that the closed-loop control can run.

Furthermore, in the case of a 2×3-phase system, the equations $$I_{U1}+I_{V1}+I_{W1}=0 \text{ and } I_{U2}+I_{V2}+I_{W2}=0$$

need to apply, as a result of which, in addition to the six current equations, two further equations are present, with the result that it would also be possible for a third harmonic to be determined as well. In this way, eight equations with eight unknowns are obtained under the assumptions as described above. In general, in this way 2n−1 harmonics can be taken into consideration in addition to the fundamental for an n×3-phase system.

Within the scope of the invention, the electric machine is now preferably operated taking into consideration only the fundamental determined or current values of the fundamental, for example is subjected to closed-loop control in respect of its torque.

The invention claimed is:

1. A method for operating an electric machine (100) comprising a power converter (110) and a plurality of phases (U1, V1, W1, U2, V2, W2), the method comprising:

during operation of the electric machine (100), determining phase currents ($I_{U1}$, $I_{V1}$, $I_{W1}$, $I_{U2}$, $I_{V2}$, $I_{W2}$) flowing through the phases; and using the determined phase currents for the continued operation of the electric machine (100), wherein the phase currents ($I_{U1}$, $I_{V1}$, $I_{W1}$, $I_{U2}$, $I_{V2}$, $I_{W2}$) are determined taking into consideration a fundamental and at least one harmonic of a current characteristic of each phase current, and wherein the phase currents are measured at different times ($t_1$, $t_2$) and converted into the phase currents ($I_{U1}$, $I_{V1}$, $I_{W1}$, $I_{U2}$, $I_{V2}$, $I_{W2}$) for a common time ($t_1$).

2. The method as claimed in claim 1, in which at least two of the phases (U1, V1, W1, U2, V2, W2) are driven so as to have a time offset in the power converter.

3. The method as claimed in claim 1, in which the plurality of phases (U1, V1, W1, U2, V2, W2) are divided into at least two three-phase current groups, and in each case two of the at least two three-phase current groups are driven so as to have a time offset in the power converter.

4. The method as claimed in claim 1, wherein the phase currents ($I_{U1}$, $I_{V1}$, $I_{W1}$, $I_{U2}$, $I_{V2}$, $I_{W2}$) are split into phase currents of the fundamental and the at least one harmonic.

5. The method as claimed in claim 4, wherein only the phase currents of the harmonic are determined as the phase currents ($I_{U1}$, $I_{V1}$, $I_{W1}$, $I_{U2}$, $I_{V2}$, $I_{W2}$).

6. The method as claimed in claim 1, in which closed-loop control of the electric machine (100) in respect of a preset torque takes place on the basis of the determined phase currents ($I_{U1}$, $I_{V1}$, $I_{W1}$, $I_{U2}$, $I_{V2}$, $I_{W2}$).

7. The method as claimed in claim 1, in which a diagnosis of the electric machine (100) is performed on the basis of the determined phase currents ($I_{U1}$, $I_{V1}$, $I_{W1}$, $I_{U2}$, $I_{V2}$, $I_{W2}$).

8. The method as claimed in claim 1, in which measured phase currents are plausibility-checked on the basis of the determined phase currents ($I_{U1}$, $I_{V1}$, $I_{W1}$, $I_{U2}$, $I_{V2}$, $I_{W2}$).

9. An arithmetic logic unit (150), which is designed to perform all of the method steps of a method as claimed in claim 1.

10. A non-transitory, computer-readable medium containing instructions that when executed by a computer cause the computer to control an electric machine (100) that include a power converter (110) and a plurality of phases (U1, V1, W1, U2, V2, W2), by:

during operation of the electric machine (100), determining phase currents ($I_{U1}$, $I_{V1}$, $I_{W1}$, $I_{U2}$, $I_{V2}$, $I_{W2}$) flowing through the phases; and using the determined phase currents for the continued operation of the electric machine (100), wherein the phase currents ($I_{U1}$, $I_{V1}$, $I_{W1}$, $I_{U2}$, $I_{V2}$, $I_{W2}$) are determined taking into consideration a fundamental and at least one harmonic of a current characteristic of each phase current, and wherein the phase currents are measured at different times ($t_1$, $t_2$) and converted into the phase currents ($I_{U1}$, $I_{V1}$, $I_{W1}$, $I_{U2}$, $I_{V2}$, $I_{W2}$) for a common time ($t_1$).

* * * * *